United States Patent
Son

(10) Patent No.: US 10,795,122 B2
(45) Date of Patent: Oct. 6, 2020

(54) OPTICAL IMAGING SYSTEM

(71) Applicant: SAMSUNG ELECTRO-MECHANICS CO., LTD., Suwon-si (KR)

(72) Inventor: Ju Hwa Son, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 115 days.

(21) Appl. No.: 15/085,125

(22) Filed: Mar. 30, 2016

(65) Prior Publication Data

US 2017/0102521 A1 Apr. 13, 2017

(30) Foreign Application Priority Data

Oct. 13, 2015 (KR) .................. 10-2015-0142841

(51) Int. Cl.
*G02B 9/60* (2006.01)
*G02B 13/00* (2006.01)
*G02B 1/04* (2006.01)
*G02B 5/00* (2006.01)
*G02B 5/20* (2006.01)
*G02B 27/00* (2006.01)

(52) U.S. Cl.
CPC .......... *G02B 13/0045* (2013.01); *G02B 1/04* (2013.01); *G02B 5/005* (2013.01); *G02B 5/208* (2013.01); *G02B 9/60* (2013.01); *G02B 27/0025* (2013.01)

(58) Field of Classification Search
CPC .... G02B 21/02; G02B 21/0068; G02B 21/33; G02B 13/04; G02B 13/06; G02B 13/0045; G02B 9/12; G02B 9/62; G02B 9/60; G02B 5/005; G02B 5/208

USPC .................. 359/714, 716, 658, 752, 756
See application file for complete search history.

(56) References Cited

U.S. PATENT DOCUMENTS

| | | |
|---|---|---|
| 7,864,454 B1 | 1/2011 | Tang et al. |
| 7,911,711 B1 * | 3/2011 | Tang .................. G02B 13/0045 359/715 |
| 8,000,031 B1 | 8/2011 | Tsai |
| 8,395,852 B2 | 3/2013 | Tsai et al. |
| 8,705,181 B2 | 4/2014 | Hsu et al. |
| 9,529,177 B2 | 12/2016 | Kanda |

(Continued)

FOREIGN PATENT DOCUMENTS

| | | |
|---|---|---|
| CN | 202583582 U | 12/2012 |
| CN | 104570294 A | 4/2015 |

(Continued)

OTHER PUBLICATIONS http://ophthalnniclenses.blogspot.conn/2011/07/story-of-cr-39.htnnl, Mahesh (Year: 2013).*

(Continued)

*Primary Examiner* — Travis S Fissel
(74) *Attorney, Agent, or Firm* — NSIP Law

(57) ABSTRACT

An optical imaging system includes a first lens, a second lens, a third lens, a fourth lens, and a fifth lens having an inflection point formed on an image-side surface thereof. The first to fifth lenses are sequentially disposed from an object side to an imaging plane. The optical imaging system satisfies TTL/(ImgH*2)<0.65, where TTL is a distance from an object-side surface of the first lens to the imaging plane, and ImgH*2 is a diagonal length of the imaging plane.

20 Claims, 15 Drawing Sheets

(56) References Cited

U.S. PATENT DOCUMENTS

| | | | |
|---|---|---|---|
| 2013/0088788 A1 | 4/2013 | You | |
| 2013/0182336 A1* | 7/2013 | Hsu | G02B 13/0045 359/714 |
| 2014/0002909 A1* | 1/2014 | Yonezawa | G02B 13/18 359/714 |
| 2014/0071543 A1* | 3/2014 | Shinohara | G02B 13/18 359/713 |
| 2014/0111872 A1* | 4/2014 | Tang | G02B 13/22 359/713 |
| 2014/0204480 A1* | 7/2014 | Jo | G02B 13/0045 359/764 |
| 2014/0285907 A1 | 9/2014 | Tang et al. | |
| 2014/0285908 A1* | 9/2014 | Hsu | G02B 9/34 359/715 |
| 2014/0293452 A1* | 10/2014 | Kanda | G02B 13/0045 359/714 |
| 2015/0022701 A1 | 1/2015 | Chen | |
| 2015/0109684 A1* | 4/2015 | Son | G02B 3/04 359/713 |
| 2015/0109692 A1 | 4/2015 | Son | |
| 2015/0160439 A1* | 6/2015 | Tsai | G02B 9/60 359/714 |
| 2015/0226939 A1* | 8/2015 | Kanda | G02B 13/0045 359/714 |
| 2015/0241660 A1 | 8/2015 | Son | |
| 2016/0116705 A1 | 4/2016 | Lee et al. | |
| 2016/0238821 A1* | 8/2016 | Liao | G02B 5/208 |

FOREIGN PATENT DOCUMENTS

| | | | |
|---|---|---|---|
| CN | 104880804 A | 9/2015 | |
| CN | 204613493 U | 9/2015 | |
| JP | 2015-165286 A | 9/2015 | |
| KR | 2013-0038631 A | 4/2013 | |
| KR | 1020140147625 * | 10/2014 | G02B 9/60 |
| KR | 10-2016-0049871 A | 5/2016 | |
| KR | 10-1660218 B1 | 9/2016 | |

OTHER PUBLICATIONS

Taiwanese Office Action dated Sep. 4, 2017 in corresponding Taiwanese Patent Application No. 105110973 (4 pages in English and 4 pages in Chinese).
Chinese Office Action dated Jun. 4, 2018 in Chinese Patent Application No. 201610251979.9 (9 pages in English, 6 pages in Chinese).
Chinese Office Action dated Feb. 25, 2019 in corresponding Chinese Patent Application No. 201610251979.9 (10 pages in English, 8 pages in Chinese).
Korean Office Action dated Mar. 27, 2017, in counterpart Korean Application No. 10-2015-0142841 (8 pages including English translation).
Korean Office Action dated Nov. 10, 2016, in counterpart Korean Application No. 10-2015-0142841 (9 pages including English translation).

* cited by examiner

| FOV = | 83.20 | TTL = | 3.76 | f = | 3.352 | |
|---|---|---|---|---|---|---|
| SURFACE NO. | | RADIUS OF CURVATURE | THICKNESS /DISTANCE | REFRACTIVE INDEX | ABBE NUMBER | EFFECTIVE RADIUS |
| 0 | | | | | | |
| 1 | FIRST LENS | 1.1751 | 0.5531 | 1.537 | 55.66 | 0.8000 |
| 2 | | -100.9533 | 0.0300 | | | 0.6939 |
| 3 | SECOND LENS (STOP) | -57.7817 | 0.2350 | 1.646 | 23.52 | 0.6594 |
| 4 | | 2.7913 | 0.1948 | | | 0.5600 |
| 5 | THIRD LENS | -9.8673 | 0.3452 | 1.537 | 55.66 | 0.6164 |
| 6 | | -4.3078 | 0.4989 | | | 0.8145 |
| 7 | FOURTH LENS | -18.3226 | 0.3962 | 1.646 | 23.52 | 1.2209 |
| 8 | | 23.0550 | 0.1435 | | | 1.5551 |
| 9 | FIFTH LENS | 1.8012 | 0.5452 | 1.537 | 55.66 | 2.0832 |
| 10 | | 1.2014 | 0.1381 | | | 2.3143 |
| 11 | FILTER | INFINITY | 0.1100 | 1.516 | 55.10 | 2.6618 |
| 12 | | INFINITY | 0.5713 | | | 2.7028 |
| 13 | IMAGING PLANE | INFINITY | -0.0013 | | | 3.0626 |

FIG. 4

| SURFACE NO. | S1 | S2 | S3 | S4 | S5 | S6 | S7 | S8 | S9 | S10 |
|---|---|---|---|---|---|---|---|---|---|---|
| K | -0.01296 | 9.86007 | 0.58517 | 1.00000 | 2.04108 | -9.17347 | -4.09977 | -16.58370 | -1.13789 | -0.95913 |
| A | -0.02253 | 0.01029 | 0.06936 | 0.08102 | -0.15211 | -0.14298 | 0.01429 | -0.26579 | -0.82762 | -0.56965 |
| B | 0.17718 | 0.25286 | 0.15455 | 0.08102 | -0.10764 | 0.08290 | -0.38680 | 0.16178 | 0.63448 | 0.50450 |
| C | -1.14476 | -0.57733 | 0.67289 | 0.08103 | 0.15210 | -0.80271 | 0.59085 | 0.12778 | -0.25357 | -0.35325 |
| D | 4.07760 | -2.38824 | -8.92100 | 0.08094 | 0.15211 | 3.41353 | -0.51889 | -0.39685 | 0.06078 | 0.16964 |
| E | -8.43838 | 14.10127 | 34.57446 | 0.08126 | 0.15202 | -6.82891 | -0.17261 | 0.31419 | -0.00892 | -0.05223 |
| F | 9.11829 | -26.62054 | -59.46250 | 0.08090 | 0.12031 | 7.74894 | 0.42911 | -0.10461 | 0.00076 | 0.00969 |
| G | -4.14175 | 17.20017 | 38.09582 | 0.08114 | -0.15218 | -3.46877 | -0.13789 | 0.01270 | -0.00003 | -0.00097 |
| H | | | | | | | | | | 0.00004 |

FIG. 5

| FOV = | 83.40 | TTL = | 3.76 | f = | 3.334 | |
|---|---|---|---|---|---|---|
| SURFACE NO. | | RADIUS OF CURVATURE | THICKNESS /DISTANCE | REFRACTIVE INDEX | ABBE NUMBER | EFFECTIVE RADIUS |
| 0 | STOP | | | | | |
| 1 | FIRST LENS | 1.1524 | 0.5415 | 1.547 | 56.11 | 0.7800 |
| 2 | | 43.0009 | 0.0300 | | | 0.6892 |
| 3 | SECOND LENS | -21.4404 | 0.2100 | 1.646 | 23.52 | 0.6649 |
| 4 | | 3.1245 | 0.1978 | | | 0.5600 |
| 5 | THIRD LENS | -7.6451 | 0.3056 | 1.547 | 56.11 | 0.6288 |
| 6 | | -4.4117 | 0.5956 | | | 0.8131 |
| 7 | FOURTH LENS | -13.4265 | 0.4954 | 1.646 | 23.52 | 1.2753 |
| 8 | | 21.7232 | 0.0680 | | | 1.6784 |
| 9 | FIFTH LENS | 1.3939 | 0.4773 | 1.547 | 56.11 | 2.1499 |
| 10 | | 1.0618 | 0.1588 | | | 2.3300 |
| 11 | FILTER | INFINITY | 0.1100 | 1.516 | 55.10 | 2.6618 |
| 12 | | INFINITY | 0.5687 | | | 2.6972 |
| 13 | IMAGING PLANE | INFINITY | 0.0013 | | | 3.0466 |

FIG. 9

| SURFACE NO. | S1 | S2 | S3 | S4 | S5 | S6 | S7 | S8 | S9 | S10 |
|---|---|---|---|---|---|---|---|---|---|---|
| K | -0.00957 | 9.62686 | 0.17033 | 1.00000 | 1.17192 | -8.94632 | -4.09977 | -16.58370 | -1.61993 | -1.01643 |
| A | -0.01709 | -0.04755 | 0.04940 | 0.10610 | -0.21081 | -0.15025 | 0.14813 | -0.13953 | -0.79994 | -0.63364 |
| B | 0.19776 | 0.49981 | 0.38214 | 0.10610 | -0.13347 | 0.00184 | -0.64145 | -0.00048 | 0.63381 | 0.56935 |
| C | -1.39133 | -1.78864 | -0.51408 | 0.10610 | 0.08838 | -0.50347 | 1.01315 | 0.19395 | -0.28999 | -0.39602 |
| D | 5.34253 | 3.12791 | -1.38818 | 0.10610 | 0.21061 | 2.97123 | -0.99503 | -0.27474 | 0.08624 | 0.18545 |
| E | -11.69444 | -1.07517 | 7.23354 | 0.10610 | 0.20081 | -6.80343 | 0.35995 | 0.15683 | -0.01634 | -0.05457 |
| F | 13.18265 | -4.89262 | -9.83765 | 0.10610 | -0.21081 | 8.61055 | 0.04090 | -0.04030 | 0.00179 | 0.00953 |
| G | -6.18918 | 4.55158 | 3.21342 | 0.10610 | -0.21081 | -4.18807 | -0.03389 | 0.00387 | -0.00009 | -0.00089 |
| H | | | | | | | | | | 0.00003 |

FIG. 10

| FOV = | 86.00 | TTL = | 3.76 | f = | 3.194 | |
|---|---|---|---|---|---|---|
| SURFACE NO. | | RADIUS OF CURVATURE | THICKNESS /DISTANCE | REFRACTIVE INDEX | ABBE NUMBER | EFFECTIVE RADIUS |
| 0 | STOP | | | | | |
| 1 | FIRST LENS | 1.2156 | 0.4693 | 1.547 | 56.11 | 0.6950 |
| 2 | | -22.6281 | 0.0150 | | | 0.6430 |
| 3 | SECOND LENS | -1373.0593 | 0.2350 | 1.646 | 23.52 | 0.6305 |
| 4 | | 2.6452 | 0.2018 | | | 0.6000 |
| 5 | THIRD LENS | -5.4909 | 0.3770 | 1.547 | 56.11 | 0.6449 |
| 6 | | -3.4777 | 0.5025 | | | 0.8482 |
| 7 | FOURTH LENS | -20.3496 | 0.4033 | 1.646 | 23.52 | 1.2929 |
| 8 | | 21.4652 | 0.1104 | | | 1.7088 |
| 9 | FIFTH LENS | 1.4318 | 0.5796 | 1.547 | 56.11 | 2.2500 |
| 10 | | 1.0826 | 0.1861 | | | 2.4035 |
| 11 | FILTER | INFINITY | 0.1100 | 1.516 | 55.10 | 2.7091 |
| 12 | | INFINITY | 0.5636 | | | 2.7425 |
| 13 | IMAGING PLANE | INFINITY | 0.0064 | | | 3.0467 |

FIG. 14

| SURFACE NO. | S1 | S2 | S3 | S4 | S5 | S6 | S7 | S8 | S9 | S10 |
|---|---|---|---|---|---|---|---|---|---|---|
| K | -0.05513 | -5.08004 | 0.23455 | 1.00000 | 0.96225 | -2.96892 | -4.09977 | -16.24029 | -1.61269 | -1.01454 |
| A | -0.03076 | 0.08339 | 0.11522 | 0.06102 | -0.16081 | -0.11137 | 0.21080 | 0.03729 | -0.57851 | -0.52274 |
| B | 0.43714 | -0.08900 | 0.04818 | 0.06810 | -0.16081 | -0.10866 | -0.59110 | -0.26492 | 0.32690 | 0.41103 |
| C | -3.42811 | 0.20264 | -0.15000 | 0.06102 | 0.16102 | -0.10266 | 0.46405 | 0.38847 | -0.08346 | -0.25772 |
| D | 14.44240 | -0.86703 | -0.15000 | 0.06102 | 0.16102 | 1.61260 | 0.12523 | -0.34206 | 0.00799 | 0.11025 |
| E | -34.49584 | -2.45027 | -0.15000 | 0.06102 | 0.16102 | -4.08109 | -0.66667 | 0.16444 | 0.00071 | -0.03019 |
| F | 43.04600 | 8.51408 | 0.15000 | 0.06102 | 0.16102 | 5.26318 | 0.47793 | -0.03925 | -0.00022 | 0.00500 |
| G | -22.47563 | -7.23910 | 0.15000 | 0.03078 | 0.16102 | -2.36113 | -0.10398 | 0.00363 | 0.00001 | -0.00045 |
| H |  |  |  |  |  |  |  |  |  | 0.00002 |

FIG. 15

OPTICAL IMAGING SYSTEM

CROSS-REFERENCE TO RELATED APPLICATION(S)

This application claims the benefit under 35 USC 119(a) of Korean Patent Application No. 10-2015-0142841 filed on Oct. 13, 2015, in the Korean Intellectual Property Office, the entire disclosure of which is incorporated herein by reference for all purposes.

BACKGROUND

1. Field

The following description relates to an optical imaging system including five lenses.

2. Description of Related Art

An optical imaging system mounted in a camera of a portable terminal includes a plurality of lenses. An optical imaging system having a high level of resolution may be realized by a plurality of lenses. The optical imaging system including five lenses may, for example, realize higher resolution than resolution realized by an optical imaging system including three or four lenses.

However, when the number of lenses configured in the optical imaging system is increased, a total track length (TTL) of the optical imaging system is increased, and thus, it is difficult to mount the optical imaging system in a small portable terminal. Therefore, there is a need to develop an optical imaging system including five lenses and having a short total track length.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system comprises a first lens, a second lens, a third lens, a fourth lens, and a fifth lens having an inflection point formed on an image-side surface thereof. The first to fifth lenses are sequentially disposed from an object side to an imaging plane. The optical imaging system satisfies TTL/(ImgH*2)<0.65, where TTL is a distance from an object-side surface of the first lens to the imaging plane, and ImgH*2 is a diagonal length of the imaging plane.

Both surfaces of the first lens may be convex.

The object-side surface of the first lens may be convex and an image-side surface thereof may be concave.

Both surfaces of the second lens may be concave.

An object-side surface of the third lens may be concave and an image-side surface thereof may be convex.

Both surfaces of the fourth lens may be concave.

An object-side surface of the fifth lens may be convex and an image-side surface thereof may be concave.

A filter may be disposed between the fifth lens and the imaging plane, and formed of plastic.

The optical imaging system may satisfy 0.10<Df<0.12 [mm], where Df is a thickness of the filter.

The optical imaging system may satisfy Df/ImgH<0.04, where Df is a thickness of the filter, and ImgH is ½ of the diagonal length of the imaging plane.

The optical imaging system may satisfy 55.0<Vf<60.0, where Vf is an Abbe number of the filter.

The optical imaging system may satisfy TTL≤3.80 [mm], where TTL is the distance from the object-side surface of the first lens to the imaging plane.

The optical imaging system may satisfy 80<FOV is satisfied, where FOV is a maximum field of view of the optical imaging system.

The optical imaging system may satisfy G12<0.031 [mm], where G12 is a distance from an image-side surface of the first lens to an object-side surface of the second lens.

In another general aspect, an optical imaging system comprises a first lens, a second lens comprising a concave object-side surface, a third lens comprising a concave object-side surface, a fourth lens comprising a concave object-side and image-side surfaces, and a fifth lens having an inflection point formed on an image-side surface thereof. The first to fifth lenses are sequentially disposed from an object side to an imaging plane.

The second lens, the fourth lens, and the fifth lens may have the same refractive power.

BRIEF DESCRIPTION OF DRAWINGS

FIG. 4 is a table of an example of characteristics of lenses of the optical imaging system illustrated in FIG. 1.

FIG. 5 is a table of an example of aspherical values of the optical imaging system illustrated in FIG. 1.

FIG. 9 is a table of an example of characteristics of lenses of the optical imaging system illustrated in FIG. 6.

FIG. 10 is a table of an example of aspherical values of the optical imaging system illustrated in FIG. 6.

FIG. 14 is a table of an example of characteristics of lenses of the optical imaging system illustrated in FIG. 11.

FIG. 15 is a table of an example of aspherical values of the optical imaging system illustrated in FIG. 11.

Figure 1:
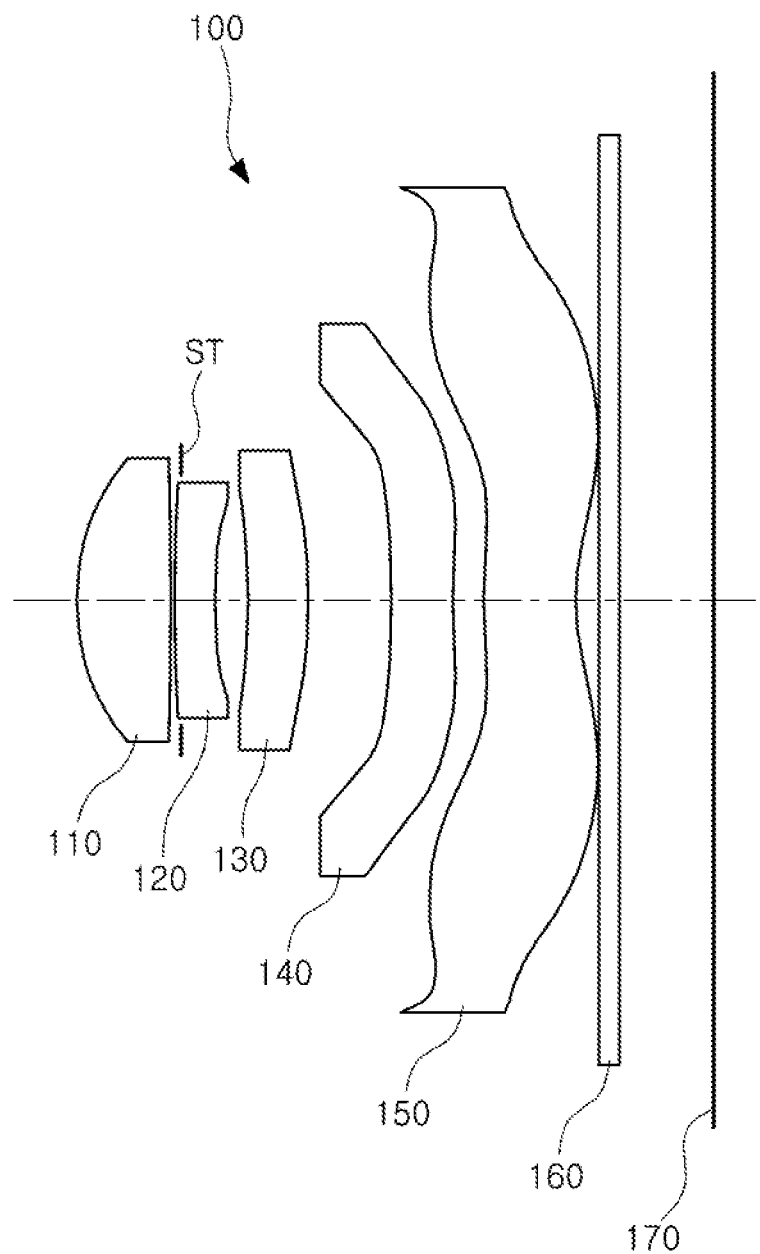
FIG. 1 is a diagram illustrating an example of an optical imaging system.

Other features and aspects will be apparent from the following detailed description, the drawings, and the claims.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. If the device in the figures is turned over, elements described as "above," or "upper" other elements would then, for example, be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

In addition, in the present specification, a first lens refers to a lens closest to an object (or a subject), while a fifth lens refers to a lens closest to an imaging plane (or an image sensor). In addition, all of radii of curvature and thicknesses of lenses, a TTL, an ImgH (½ of a diagonal length of the imaging plane), and focal lengths are represented by millimeters (mm). Further, thicknesses of the lenses, gaps between the lenses, and the TTL are distances in optical axes of the lenses. Further, in a description for shapes of the lenses, the meaning that one surface of a lens is convex is that an optical axis portion of a corresponding surface is convex, and the meaning that one surface of a lens is concave is that an optical axis portion of a corresponding surface is concave. Therefore, although it is described that one surface of a lens is convex, an edge portion of the lens may be concave. Likewise, although it is described that one surface of a lens is concave, an edge portion of the lens may be convex.

In addition, an object-side surface of each lens refers to a surface of the corresponding lens closest to an object, while an image-side surface of each lens refers to a surface of the corresponding lens closest to the imaging plane.

An optical imaging system may include an optical system including a plurality of lenses. The optical system of the optical imaging system may, for example, include five lenses having refractive powers. However, the optical imaging system is not limited to including only the lenses having the refractive power. The optical imaging system may, for example, include a stop for controlling an amount of incident light. In addition, the optical imaging system may further include an infrared cut-off filter filtering infrared light. Further, the optical imaging system may include an image sensor (that is, an imaging device) converting an image of a subject incident thereto through the optical system into electrical signals. Further, the optical imaging system may include a gap maintaining member adjusting a gap between lenses.

First to fifth lenses may be formed of materials having a refractive index different from that of air. The first to fifth lenses may, for example, be formed of plastic or glass. At least one of the first to fifth lenses may have an aspherical shape. As an example, only the fifth lens of the first to fifth lenses may have the aspherical shape. In addition, at least one surface of all of the first to fifth lenses may be aspherical. Here, an aspherical surface of each lens may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}. \quad \text{[Equation 1]}$$

In Equation 1, c is the inverse of a radius of curvature of the lens, k is a conic constant, r is a distance from a certain point on an aspherical surface of the lens to an optical axis, A to J are aspherical constants, and Z (or SAG) is a distance between the certain point on the aspherical surface of the lens at the distance Y and a tangential plane meeting the apex of the aspherical surface of the lens.

An optical imaging system may include five lenses, a filter, an image sensor, and a stop. Next, the above-mentioned components will be described.

The first lens may have refractive power. The first lens may, for example, have a positive refractive power.

At least one surface of the first lens may be convex. An object-side surface of the first lens may, for example, be convex.

The first lens may have an aspherical surface. Both surfaces of the first lens may, for example, be aspherical. The first lens may be formed of a material having high light transmissivity and excellent workability. The first lens may, for example, be formed of plastic. However, a material of the first lens is not limited to plastic. The first lens may, for example, be formed of glass.

The second lens may have refractive power. The second lens may, for example, have a negative refractive power.

The second lens may have a meniscus shape. An object-side surface of the second lens may, for example, be concave.

The second lens may have an aspherical surface. An image-side surface of the second lens may, for example, be aspherical. The second lens may be formed of a material having high light transmissivity and excellent workability, for example, the second lens may be formed of plastic. However, a material of the second lens is not limited to plastic. The second lens may, for example, be formed of glass.

The second lens may be formed of a material having a high refractive index. A refractive index of the second lens may, for example, be 1.60 or more. The second lens may have a low Abbe number. An Abbe number of the second lens may, for example, be 30 or less. The second lens configured as described above may effectively improve chromatic aberration by the first lens.

The third lens may have refractive power. The third lens may, for example, have a positive refractive power.

The third lens may have a meniscus shape. An object-side surface of the third lens may, for example, be concave.

The third lens may have an aspherical surface. Both surfaces of the third lens may, for example, be aspherical. The third lens may be formed of a material having high light transmissivity and excellent workability. The third lens may, for example, be formed of plastic. However, a material of the third lens is not limited to plastic. The third lens may, for example, be formed of glass.

The fourth lens may have refractive power. The fourth lens may, for example, have a negative refractive power.

The fourth lens may have a meniscus shape. An object-side surface of the fourth lens may, for example, be concave.

An edge of the fourth lens may be excessively bent toward one side. An SAG of an edge of the object-side surface of the fourth lens may, for example, be 0.4 mm to 0.43 mm, and an SAG of an edge of an image-side surface thereof may be 0.48 mm to 0.6 mm.

The fourth lens may have an aspherical surface. Both surfaces of the fourth lens may, for example, be aspherical. The fourth lens may be formed of a material having high light transmissivity and excellent workability. The fourth lens may, for example, be formed of plastic. However, a material of the fourth lens is not limited to plastic. The fourth lens may, for example, be formed of glass.

The fourth lens may be formed of a material having a high refractive index. A refractive index of the fourth lens may, for example, be 1.60 or more. The fourth lens may have a low Abbe number. An Abbe number of the fourth lens may, for example, be 30 or less.

The fifth lens may have refractive power. The fifth lens may, for example, have a negative refractive power.

The fifth lens may have a meniscus shape. An image-side surface of the fifth lens may, for example, be concave.

An edge of the fifth lens may be excessively bent toward one side. An SAG of an object-side surface of the fifth lens may, for example, be 0.15 mm to 0.28 mm.

The fifth lens may have inflection points. The fifth lens may, for example, have an inflection point formed on an image-sided surface thereof.

The fifth lens may have an aspherical surface. Both surfaces of the fifth lens may, for example, be aspherical. The fifth lens may be formed of a material having high light transmissivity and excellent workability. The fifth lens may, for example, be formed of plastic. However, a material of the fifth lens is not limited to plastic. The fifth lens may, for example, be formed of glass.

The filter may filter a partial wavelength from light incident through the first to fifth lenses. The filter may, for example, filter an infrared wavelength of the incident light.

The filter may be manufactured at a reduced thickness. To this end, the filter may be formed of plastic.

The image sensor may realize high resolution of 1300 megapixels. A unit size of pixels configuring the image sensor may, for example, be 1.12 μm or less.

The stop may be disposed in order to adjust an amount of light incident to the lenses. The stop may, for example, be disposed between the first lens and the second lens or may be disposed adjacently to the object-side surface of the first lens.

The optical imaging system may satisfy the following Conditional Expressions:

[Conditional Expression] $TTL \leq 3.80$ [mm]
[Conditional Expression] $TTL/(ImgH*2) \leq 0.65$
[Conditional Expression] $80 < FOV$
[Conditional Expression] $G12 < 0.031$ [mm]
[Conditional Expression] $G12/G34 \leq 0.061$
[Conditional Expression] $0.10 < Df < 0.12$ [mm]
[Conditional Expression] $55.0 < Vf < 60.0$
[Conditional Expression] $Df/ImgH < 0.04$
[Conditional Expression] $Df/(TTL*ImgH) < 0.01$ [1/mm].

Here, TTL is a distance from the object-side surface of the first lens to the imaging plane, ImgH is ½ of a diagonal length of the imaging plane, FOV is a maximum field of view of the optical imaging system, G12 is a distance from an image-side surface of the first lens to the object-side surface of the second lens, Df is a thickness of the filter, and Vf is an Abbe number of the filter.

An optical imaging system satisfying the above Conditional Expressions may be easily miniaturized and may be mounted in a small terminal. In addition, the optical imaging system satisfying the above Conditional Expressions may realize high resolution.

Next, optical imaging systems according to several embodiments will be described.

First, an optical imaging system according to a first embodiment will be described with reference to FIG. 1.

The optical imaging system 100 according to one embodiment includes an optical system including a first lens 110, a second lens 120, a third lens 130, a fourth lens 140, and a fifth lens 150. In addition, the optical imaging system 100 includes a filter 160, an image sensor 170, and a stop ST.

In the present embodiment, the first lens 110 has a positive refractive power, and both the object-side surface and image-side surface thereof are convex. The second lens 120 has a negative refractive power, and both surfaces thereof is concave. The third lens 130 has a positive refractive power, and an object-side surface thereof is concave and an image-side surface thereof is convex. The fourth lens 140 has a negative refractive power, and both surfaces thereof is concave. The fifth lens 150 has a negative refractive power, and an object-side surface thereof is convex and an image-side surface thereof is concave. A stop ST is disposed between the first lens and the second lens.

Figure 2:
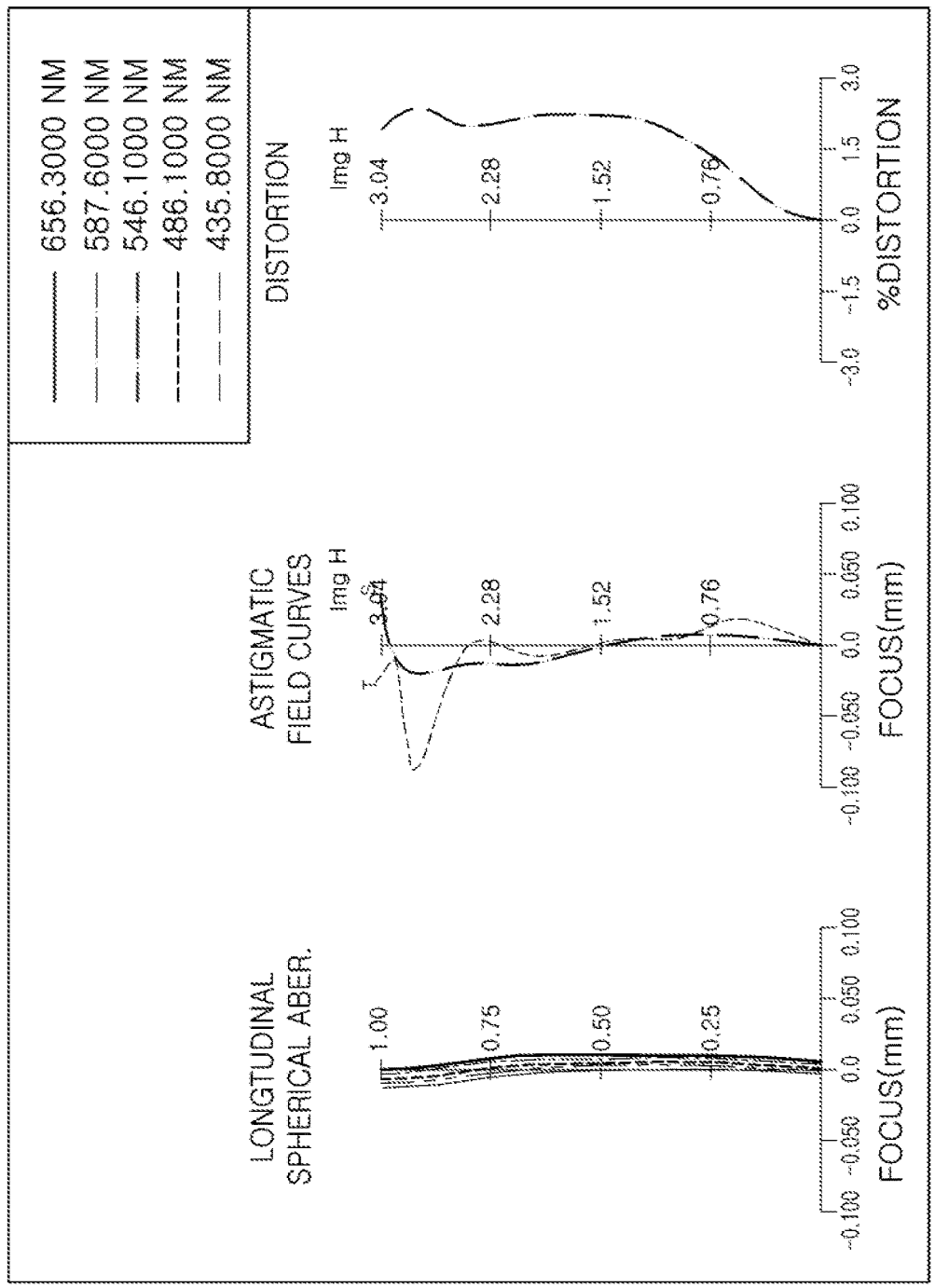
FIG. 2 is a graphical illustration of aberration curves in an example of the optical imaging system illustrated in FIG. 1.
Figure 3:
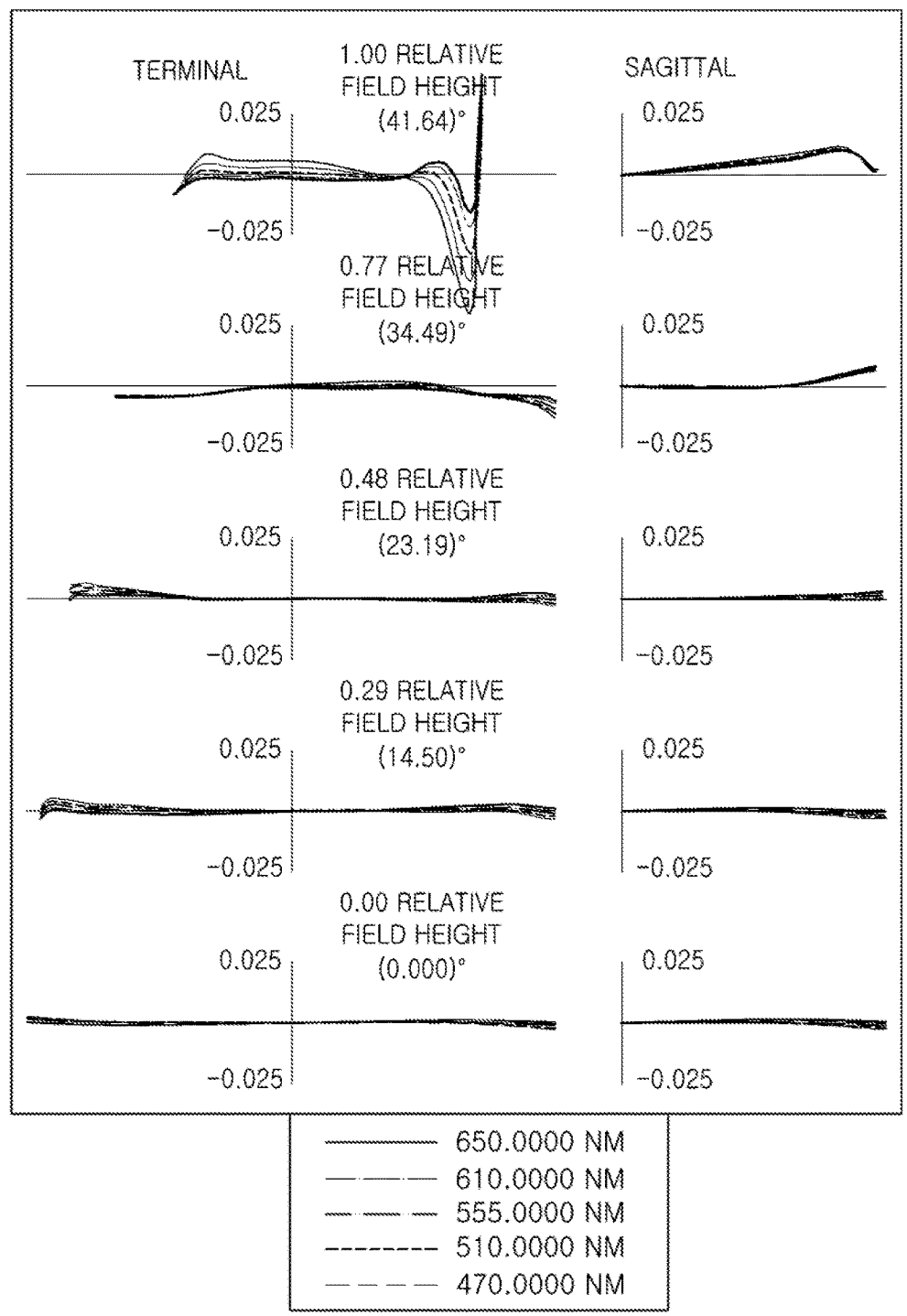
FIG. 3 is graphs of an example of modulation transfer functions (MTFs) of the optical imaging system illustrated in FIG. 1.

The optical imaging system configured as described above represents an example of aberration characteristics and modulation transfer function (MTF) characteristics illustrated in FIGS. 2 and 3. FIGS. 4 and 5 are tables of examples of characteristics of lenses and aspherical characteristics of the optical imaging system illustrated in FIG. 1.

As seen in FIG. 4, an effective radius of the optical imaging system gradually decreases from the first lens 110 to the stop ST and gradually increases from the stop ST to an imaging plane. A maximum effective radius of the optical imaging system is 3.0626, which is larger than a length (ImgH) from the center of the imaging plane to an edge of the imaging plane.

Figure 6:
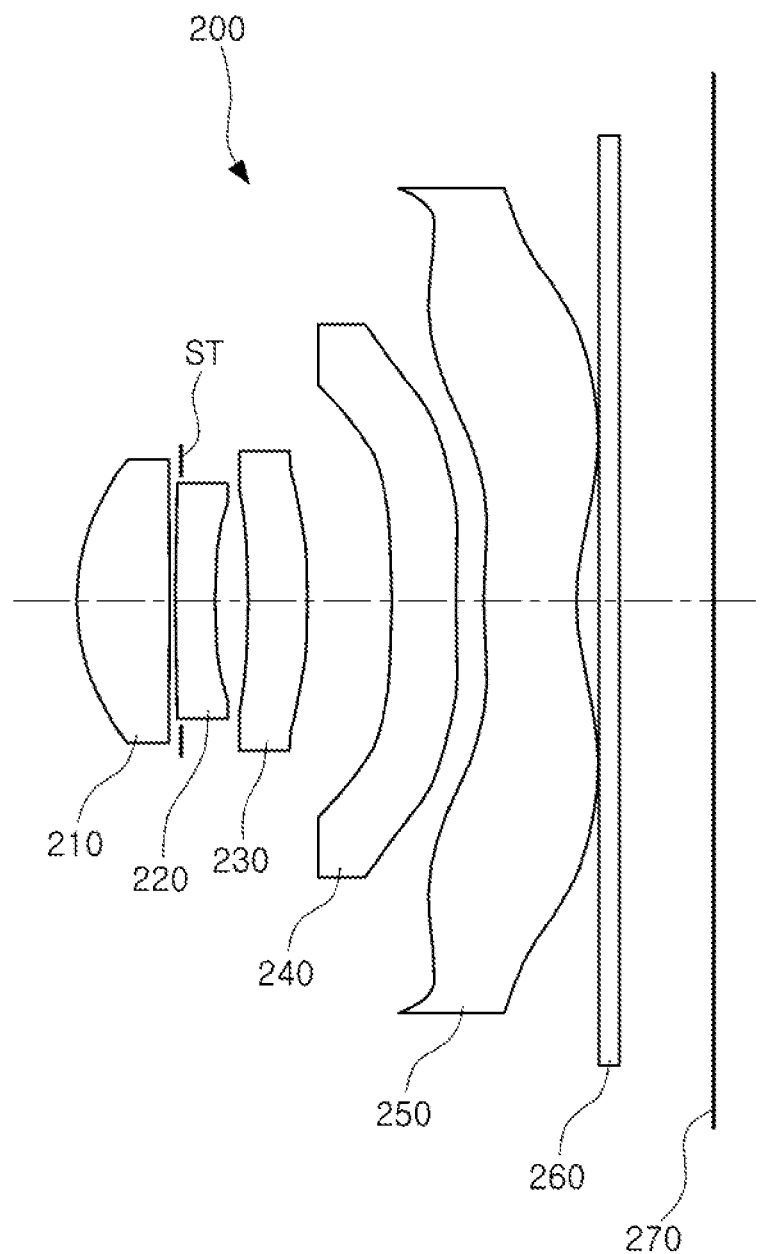
FIG. 6 is a diagram illustrating another example of an optical imaging system.

An optical imaging system according to another embodiment will be described with reference to FIG. 6.

The optical imaging system 200 according to the this embodiment includes an optical system including a first lens 210, a second lens 220, a third lens 230, a fourth lens 240, and a fifth lens 250. In addition, the optical imaging system 200 includes a filter 260, an image sensor 270, and a stop ST.

In the present embodiment, the first lens 210 has a positive refractive power, and an object-side surface thereof is convex and an image-side surface thereof is concave. The second lens 220 has a negative refractive power, and both surfaces thereof is concave. The third lens 230 has a positive refractive power, and an object-side surface thereof is concave and an image-side surface thereof is convex. The fourth lens 240 has a negative refractive power, and both surfaces thereof is concave. The fifth lens 250 has a negative refractive power, and an object-side surface thereof is convex and an image-side surface thereof is concave. A stop ST is disposed between the first lens and the third lens.

Figure 7:
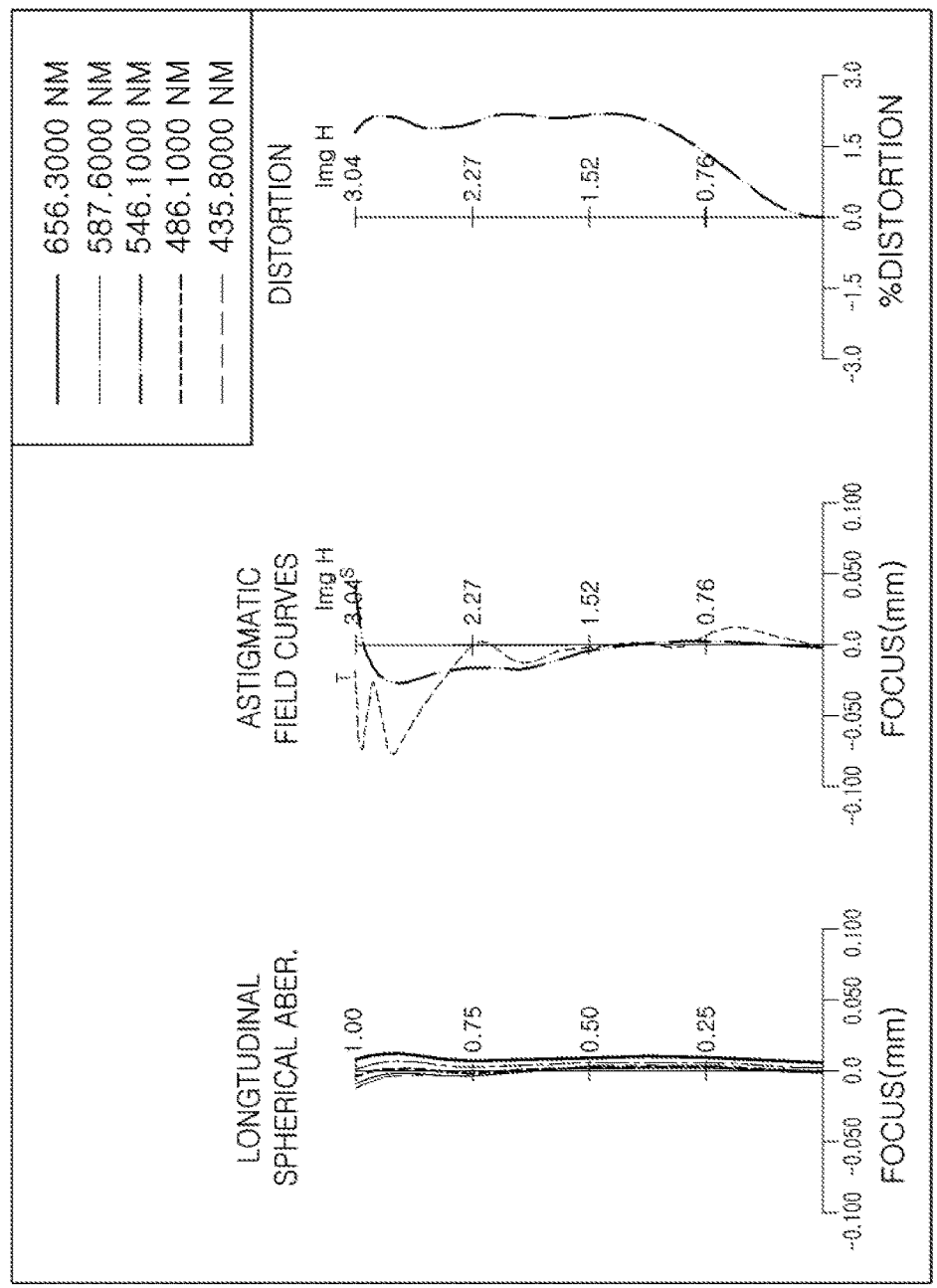
FIG. 7 is a graphical illustration of aberration curves of the optical imaging system illustrated in FIG. 6.
Figure 8:
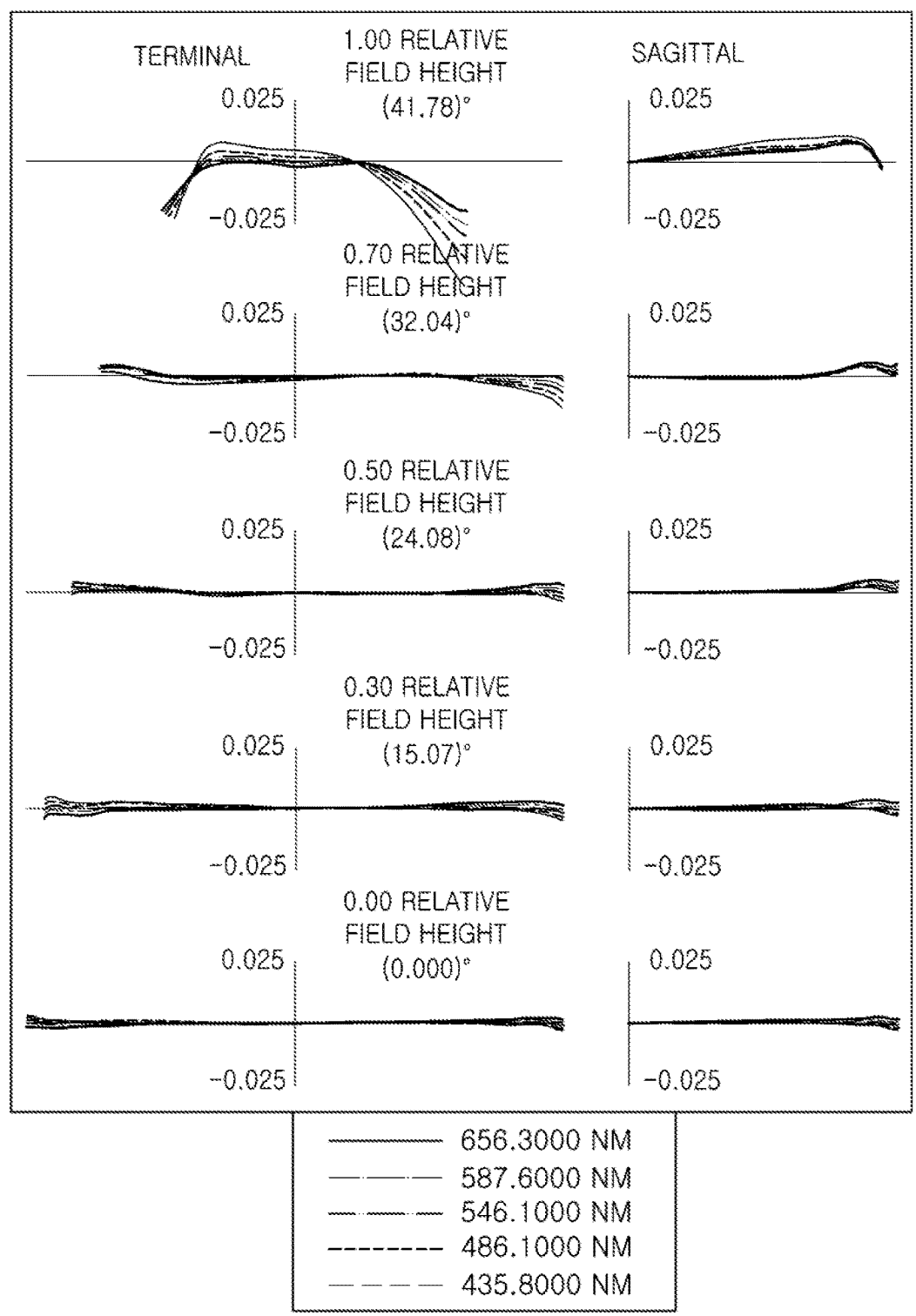
FIG. 8 is graphs of an example of MTFs of the optical imaging system illustrated in FIG. 6.

The optical imaging system configured as described above represents an example of aberration characteristics and MTF characteristics as illustrated in FIGS. 7 and 8. FIGS. 9 and 10 are tables of examples of characteristics of lenses and aspherical characteristics of the optical imaging system illustrated in FIG. 6.

As seen in FIG. 9, an effective radius of the optical imaging system gradually decreases from the first lens to the stop and gradually increases from the stop to an imaging plane. A maximum effective radius of the optical imaging system is 3.0466, which is larger than a length (ImgH) from the center of the imaging plane to an edge of the imaging plane.

Figure 11:
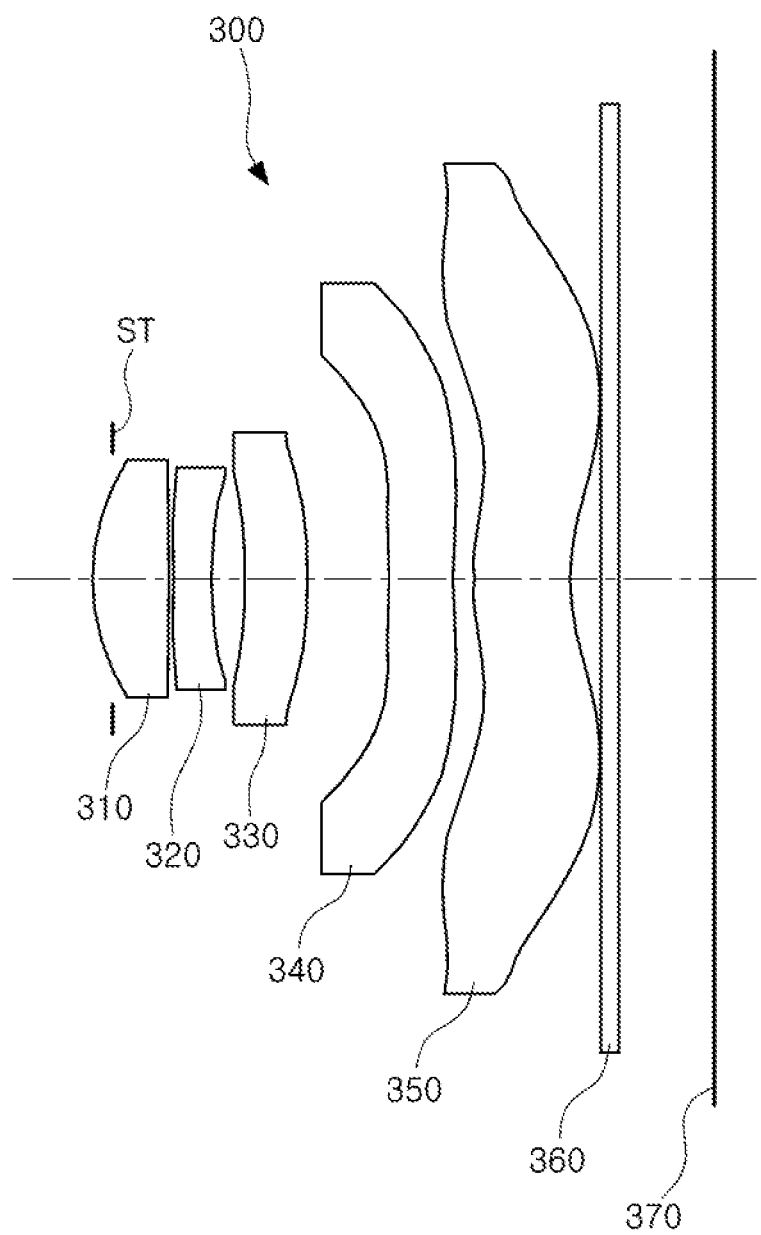
FIG. 11 is a diagram illustrating another example of an optical imaging system.

An optical imaging system according to another embodiment will be described with reference to FIG. 11.

The optical imaging system 300 according to the present embodiment includes an optical system including a first lens 310, a second lens 320, a third lens 330, a fourth lens 340, and a fifth lens 350. In addition, the optical imaging system 300 includes a filter 360, an image sensor 370, and a stop ST.

In the present embodiment, the first lens 310 has a positive refractive power, and an object-side surface thereof is convex and an image-side surface thereof is convex. The second lens 320 has a negative refractive power, and both surfaces thereof is concave. The third lens 330 has a positive refractive power, and an object-side surface thereof is concave and an image-side surface thereof is convex. The fourth lens 340 has a negative refractive power, and both surfaces thereof is concave. The fifth lens 350 has a negative refractive power, and an object-side surface thereof is convex and an image-side surface thereof is concave. A stop ST is disposed adjacently to the object-side surface of the first lens.

Figure 12:
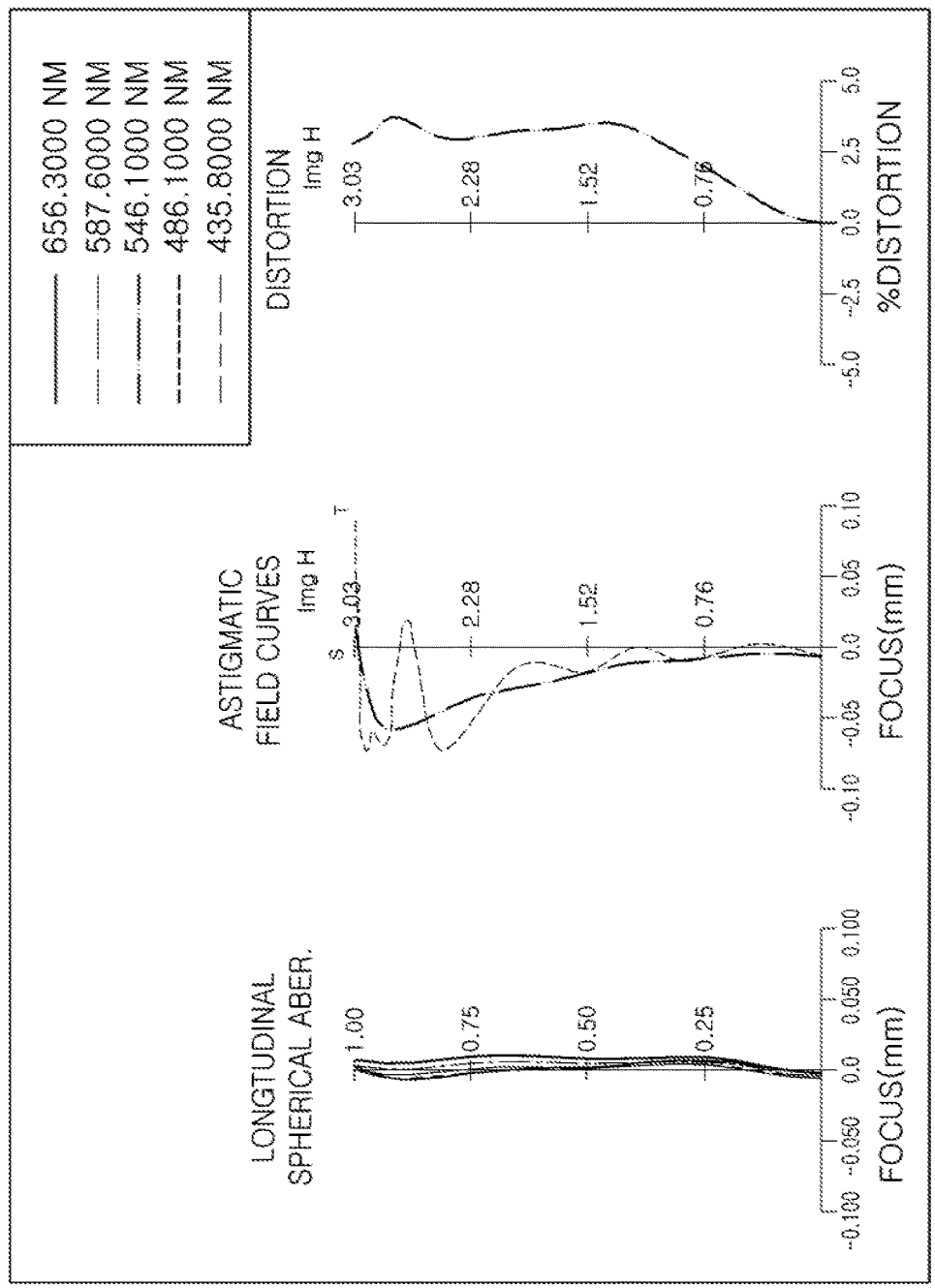
FIG. 12 is a graphical illustration of aberration curves of the optical imaging system illustrated in FIG. 11.
Figure 13:
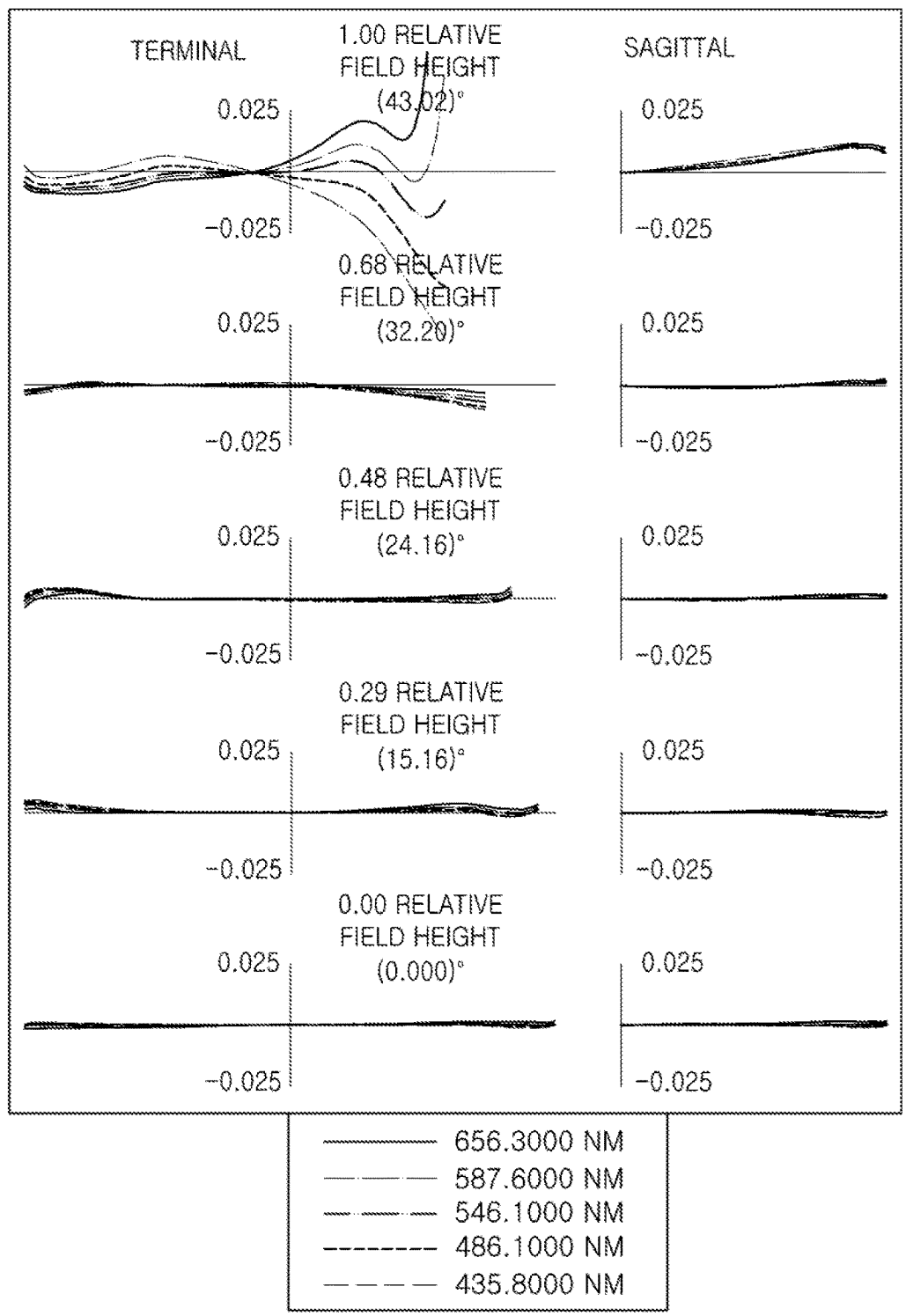
FIG. 13 is of an example of MTFs of the optical imaging system illustrated in FIG. 11.

The optical imaging system configured as described above represents an example of aberration characteristics and MTF characteristics as illustrated in FIGS. 12 and 13. FIGS. 14 and 15 are tables representing characteristics of lenses and aspherical characteristics of the optical imaging system illustrated in FIG. 11.

As seen in FIG. 14, an effective radius of the optical imaging system gradually decreases from the first lens to an image-side surface of the second lens and gradually increases from the object-side surface of the third lens to an imaging plane. A maximum effective radius of the optical imaging system is 3.0467, which is larger than a length (ImgH) from the center of the imaging plane to an edge of the imaging plane.

Table 1 represents optical characteristics of the optical imaging systems according to the embodiments. An overall focal length (f) of the optical imaging system is in a range of 3.10 to 3.45. In the optical imaging system, a focal length (f1) of the first lens is in a range of 2.0 to 2.3. In the optical imaging system, a focal length (f2) of the second lens is in a range of −3.9 to −4.3. In the optical imaging system, a focal length (f3) of the third lens is in a range of 13.0 to 20.0. In the optical imaging system, a focal length (f4) of the fourth lens is in a range of −12.0 to −17.0. In the optical imaging system, a focal length (f5) of the fifth lens is in a range of −9.0 to −21.0. In the optical imaging system, an overall length of the optical system is 3.80 or less. A maximum field of view of the optical imaging system is 80 degrees or more.

TABLE 1

| Remarks | First Embodiment | Second Embodiment | Third Embodiment |
| --- | --- | --- | --- |
| f1 | 2.169 | 2.157 | 2.126 |
| f2 | −4.119 | −4.210 | −4.090 |
| f3 | 13.949 | 18.470 | 16.279 |
| f4 | −15.756 | −12.784 | −16.121 |

TABLE 1-continued

| Remarks | First Embodiment | Second Embodiment | Third Embodiment |
| --- | --- | --- | --- |
| f5 | −9.851 | −16.572 | −19.656 |
| TTL | 3.760 | 3.760 | 3.760 |
| f | 3.352 | 3.334 | 3.194 |
| ImgH | 3.063 | 3.046 | 3.047 |
| FOV | 83.20 | 83.40 | 86.00 |

Table 2 represents values of Conditional Expressions of the optical imaging systems according to the disclosed embodiments.

TABLE 2

| Remarks | First Embodiment | Second Embodiment | Third Embodiment |
| --- | --- | --- | --- |
| TTL | 3.760 | 3.760 | 3.760 |
| TTL/(ImgH*2) | 0.614 | 0.617 | 0.617 |
| FOV | 83.20 | 83.40 | 86.00 |
| G12 | 0.030 | 0.030 | 0.015 |
| G12/G34 | 0.060 | 0.050 | 0.030 |
| Df | 0.110 | 0.110 | 0.110 |
| Vf | 55.10 | 55.10 | 55.10 |
| Df/ImgH | 0.036 | 0.036 | 0.036 |
| Df/(TTL*ImgH) | 0.010 | 0.010 | 0.010 |

As seen in Table 2, the optical imaging system according to the disclosed embodiments satisfy the above Conditional Expressions.

As set forth above, according to embodiments, an optical imaging system capable of being mounted in a small terminal and having a high level of resolution is realized.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens comprising a convex object-side surface and a concave image-side surface in paraxial regions thereof;
a second lens comprising a concave object-side surface in a paraxial region thereof;
a third lens having a positive refractive power and comprising a concave object-side surface and a convex image-side surface in paraxial regions thereof;
a fourth lens comprising a concave object-side surface in a paraxial region thereof; and
a fifth lens comprising a convex object-side surface in a paraxial region thereof and having an inflection point formed on an image-side surface thereof, wherein the first to fifth lenses are sequentially disposed from an object side of the optical imaging system toward an imaging plane of the optical imaging system, and TTL/(ImgH*2)<0.65 is satisfied, where TTL is a distance from the object-side surface of the first lens to the imaging plane, and ImgH*2 is a diagonal length of the imaging plane.

2. The optical imaging system of claim 1, wherein the second lens further comprises a concave image-side surface in a paraxial region thereof.

3. The optical imaging system of claim 1, wherein the fourth lens further comprises a concave image-side surface in a paraxial region thereof.

4. The optical imaging system of claim 1, wherein the image-side surface of the fifth lens is concave in a paraxial region thereof.

5. The optical imaging system of claim 1, further comprising a filter disposed between the fifth lens and the imaging plane and made of plastic.

6. The optical imaging system of claim 5, wherein 0.10<Df<0.12 mm is satisfied, where Df is a thickness of the filter.

7. The optical imaging system of claim 5, wherein Df/ImgH<0.04 is satisfied, where Df is a thickness of the filter, and ImgH is one-half of the diagonal length of the imaging plane.

8. The optical imaging system of claim 5, wherein 55.0<Vf<60.0 is satisfied, where Vf is an Abbe number of the filter.

9. The optical imaging system of claim 1, wherein TTL≤3.80 mm is satisfied, where TTL is the distance from the object-side surface of the first lens to the imaging plane.

10. The optical imaging system of claim 1, wherein 80<FOV is satisfied, where FOV is a maximum field of view of the optical imaging system.

11. The optical imaging system of claim 1, wherein G12<0.031 mm is satisfied, where G12 is a distance from the image-side surface of the first lens to the object-side surface of the second lens.

12. An optical imaging system comprising:
a first lens;
a second lens comprising a concave object-side surface;
a third lens having a positive refractive power and comprising a concave object-side surface;
a fourth lens comprising a concave object-side surface and a concave image-side surface in paraxial regions thereof;
a fifth lens comprising a convex object-side surface in a paraxial region thereof and having an inflection point formed on an image-side surface thereof,
wherein the first to fifth lenses are sequentially disposed from an object side of the optical imaging system toward an imaging plane of the optical imaging system, and G12/G34≤0.061 is satisfied, where G12 is a distance from an image-side surface of the first lens to the object-side surface of the second lens and G34 is a distance from an image-side surface of the third lens to the object-side surface of the fourth lens.

13. The optical imaging system of claim 12, wherein the second lens, the fourth lens, and the fifth lens each have a negative refractive power.

14. An optical imaging system comprising:
a first lens comprising a convex object-side surface and a convex image-side surface in paraxial regions thereof;
a second lens comprising a concave object-side surface in a paraxial region thereof;
a third lens comprising a concave object-side surface and a convex image-side surface in paraxial regions thereof;
a fourth lens comprising a concave object-side surface in a paraxial region thereof; and
a fifth lens comprising a convex object-side surface in a paraxial region thereof and having an inflection point formed on an image-side surface thereof,
wherein the first to fifth lenses are sequentially disposed from an object side of the optical imaging system toward an imaging plane of the optical imaging system, and TTL/(ImgH*2)<0.65 is satisfied, where TTL is a distance from the object-side surface of the first lens to the imaging plane, and ImgH*2 is a diagonal length of the imaging plane.

15. The optical imaging system of claim 14, wherein G12<0.031 mm is satisfied, where G12 is a distance from the image-side surface of the first lens to the object-side surface of the second lens.

16. The optical imaging system of claim 15, wherein G12/G34≤0.061 is satisfied, where G34 is a distance from the image-side surface of the third lens to the object-side surface of the fourth lens.

17. The optical imaging system of claim 11, wherein G12/G34≤0.061 is satisfied, where G34 is a distance from the image-side surface of the third lens to the object-side surface of the fourth lens.

18. The optical imaging system of claim 14, wherein the third lens has a positive refractive power.

19. The optical imaging system of claim 14, wherein the fourth lens further comprises a concave image-side surface in a paraxial region thereof.

20. The optical imaging system of claim 14, wherein the third lens has a positive refractive power, and
the fourth lens further comprises a concave image-side surface in a paraxial region thereof.

* * * * *